US011491720B2

(12) United States Patent
Jordan

(10) Patent No.: US 11,491,720 B2
(45) Date of Patent: Nov. 8, 2022

(54) SYSTEMS, DEVICES, AND METHODS FOR ADDITIVE MANUFACTURING

(71) Applicant: Desktop Metal, Inc., Burlington, MA (US)

(72) Inventor: Glenn A. Jordan, Harvard, MA (US)

(73) Assignee: Desktop Metal, Inc., Burlington, MA (US)

( * ) Notice: Subject to any disclaimer, the term of this patent is extended or adjusted under 35 U.S.C. 154(b) by 885 days.

(21) Appl. No.: 16/269,713

(22) Filed: Feb. 7, 2019

(65) Prior Publication Data

US 2019/0240913 A1     Aug. 8, 2019

Related U.S. Application Data

(60) Provisional application No. 62/627,245, filed on Feb. 7, 2018.

(51) Int. Cl.
*B29C 64/35* (2017.01)
*B29C 64/255* (2017.01)
(Continued)

(52) U.S. Cl.
CPC ............ *B29C 64/255* (2017.08); *B22F 10/10* (2021.01); *B29C 64/153* (2017.08);
(Continued)

(58) Field of Classification Search
CPC ..... B29C 64/35; B29C 64/357; B29C 64/255; B22F 10/68; B22F 10/70; B22F 10/73
See application file for complete search history.

(56) References Cited

U.S. PATENT DOCUMENTS 5,658,412 A * 8/1997 Retallick ............... B29C 64/153
156/273.5
6,932,935 B1 * 8/2005 Oberhofer ............... B29C 64/35
425/375

(Continued)

FOREIGN PATENT DOCUMENTS

EP     3 434 448     1/2019

OTHER PUBLICATIONS

International Search Report and Written Opinion for International Application No. PCT/US2018/027611 dated Aug. 29, 2018.
(Continued)

*Primary Examiner* — Timothy Kennedy
(74) *Attorney, Agent, or Firm* — Wolf, Greenfield & Sacks, P.C.

(57) ABSTRACT

A de-powdering basket comprises an enclosure of at least one side wall and a bottom wall. The enclosure is configured such that, when the enclosure is disposed within a build box, the outer surfaces of the at least one side wall are substantially adjacent to the interior walls of the build box. The enclosure further comprises one or more apertures disposed within the at least one side wall, each of the apertures comprising a void that extends through the at least one side wall from an interior surface of the side wall to an exterior surface of the side wall. The enclosure may be configured to accommodate a build plate situated within the enclosure. Outer edges of the build plate may cooperate with inner surfaces of the side walls of the enclosure to prevent loose powder from passing between the outer edges of the build plate and the side walls.

19 Claims, 5 Drawing Sheets

(51) Int. Cl.

| | |
|---|---|
| *B29C 64/393* | (2017.01) |
| *B29C 64/165* | (2017.01) |
| *B29C 64/153* | (2017.01) |
| *B33Y 40/00* | (2020.01) |
| *B29C 64/357* | (2017.01) |
| *B22F 10/10* | (2021.01) |
| *B22F 3/00* | (2021.01) |

(52) U.S. Cl.
CPC ............ *B29C 64/165* (2017.08); *B29C 64/35* (2017.08); *B29C 64/357* (2017.08); *B29C 64/393* (2017.08); *B33Y 40/00* (2014.12); *B22F 3/003* (2013.01); *B22F 2201/10* (2013.01); *B22F 2201/11* (2013.01); *B22F 2202/01* (2013.01); *B22F 2202/15* (2013.01); *B22F 2999/00* (2013.01)

(56) References Cited

U.S. PATENT DOCUMENTS

| | | | |
|---|---|---|---|
| 8,545,209 B2 | 10/2013 | Shi et al. | |
| 9,887,356 B2 | 2/2018 | McAlpine et al. | |
| 10,377,061 B2 | 8/2019 | Wolfgang et al. | |
| 10,406,751 B2 | 9/2019 | Fulop et al. | |
| 10,500,789 B2 | 12/2019 | Fulop et al. | |
| 11,207,733 B2 * | 12/2021 | Pourcher | B22F 12/86 |
| 2001/0045678 A1 * | 11/2001 | Kubo | B29C 64/35 |
| | | | 425/375 |
| 2002/0090410 A1 | 7/2002 | Tochimoto et al. | |
| 2004/0003738 A1 | 1/2004 | Imiolek et al. | |
| 2004/0084814 A1 * | 5/2004 | Boyd | B33Y 40/00 |
| | | | 264/109 |
| 2005/0001356 A1 * | 1/2005 | Tochimoto | B29C 64/165 |
| | | | 425/130 |
| 2009/0211616 A1 | 8/2009 | Tafoya | |
| 2009/0255912 A1 * | 10/2009 | Dietrich | B29C 64/371 |
| | | | 425/174 |
| 2009/0283119 A1 * | 11/2009 | Moussa | B29C 64/35 |
| | | | 134/147 |
| 2011/0186081 A1 * | 8/2011 | Dunn | B08B 3/08 |
| | | | 134/184 |
| 2011/0300248 A1 | 12/2011 | Tung et al. | |
| 2013/0026680 A1 | 1/2013 | Ederer et al. | |
| 2013/0052291 A1 * | 2/2013 | Morikawa | B29C 64/35 |
| | | | 425/135 |
| 2013/0075957 A1 * | 3/2013 | Swanson | B29C 64/40 |
| | | | 264/405 |
| 2013/0241095 A1 * | 9/2013 | Korten | A61C 13/0019 |
| | | | 264/16 |
| 2013/0244040 A1 | 9/2013 | Oshima | |
| 2014/0141961 A1 | 5/2014 | Koszo et al. | |
| 2015/0258744 A1 * | 9/2015 | Muller | B33Y 10/00 |
| | | | 264/37.29 |
| 2015/0314389 A1 * | 11/2015 | Yamada | B22F 10/28 |
| | | | 219/76.1 |
| 2016/0200053 A1 * | 7/2016 | Chen | B29C 64/357 |
| | | | 425/217 |
| 2016/0263827 A1 * | 9/2016 | Fripp | B33Y 70/00 |
| 2016/0318253 A1 | 11/2016 | Barnhart | |
| 2016/0325507 A1 * | 11/2016 | Chu | B08B 3/047 |
| 2016/0368224 A1 | 12/2016 | Ooba et al. | |
| 2017/0071707 A1 | 3/2017 | Uckelmann et al. | |
| 2017/0144874 A1 * | 5/2017 | Huebinger | B33Y 40/00 |
| 2017/0239893 A1 * | 8/2017 | Hoover | B33Y 40/00 |
| 2017/0297097 A1 | 10/2017 | Gibson et al. | |
| 2017/0348910 A1 * | 12/2017 | Hutchinson | B29C 64/188 |
| 2018/0133968 A1 | 5/2018 | Zeulner | |
| 2018/0193887 A1 * | 7/2018 | Pourcher | B33Y 40/00 |
| 2018/0297114 A1 | 10/2018 | Preston et al. | |
| 2018/0297284 A1 | 10/2018 | Fulop et al. | |
| 2018/0305266 A1 | 10/2018 | Gibson et al. | |
| 2018/0307209 A1 | 10/2018 | Chin et al. | |
| 2018/0370213 A1 | 12/2018 | Gold et al. | |
| 2019/0022942 A1 | 1/2019 | Fulop et al. | |
| 2019/0039367 A1 * | 2/2019 | Roman | B33Y 40/00 |
| 2019/0076924 A1 | 3/2019 | Jepeal et al. | |
| 2019/0084229 A1 | 3/2019 | Gunther | |
| 2019/0143597 A1 * | 5/2019 | Huang | B22F 10/70 |
| | | | 425/166 |
| 2019/0184432 A1 * | 6/2019 | Dore | B08B 3/006 |
| 2021/0008808 A1 * | 1/2021 | Cudzilo | B22F 10/66 |
| 2021/0046519 A1 | 2/2021 | Go et al. | |
| 2021/0053121 A1 | 2/2021 | Go et al. | |
| 2021/0237159 A1 | 8/2021 | Go et al. | |

OTHER PUBLICATIONS

International Preliminary Report on Patentability for International Application No. PCT/US2018/027611 dated Oct. 24, 2019.
International Search Report and Written Opinion issued in International Application No. PCT/US2019/016967, dated May 6, 2019 (16 pages).
International Preliminary Report on Patentability dated Aug. 20, 2020 in connection with International Application No. PCT/US2019/016967.
U.S. Appl. No. 16/983,138, filed Aug. 3, 2020, Go et al.
U.S. Appl. No. 16/989,149, filed Aug. 10, 2020, Go et al.
U.S. Appl. No. 17/117,200, filed Dec. 10, 2020, Go et al.
PCT/US2019/016967, Aug. 20, 2020, International Preliminary Report on Patentability.

* cited by examiner

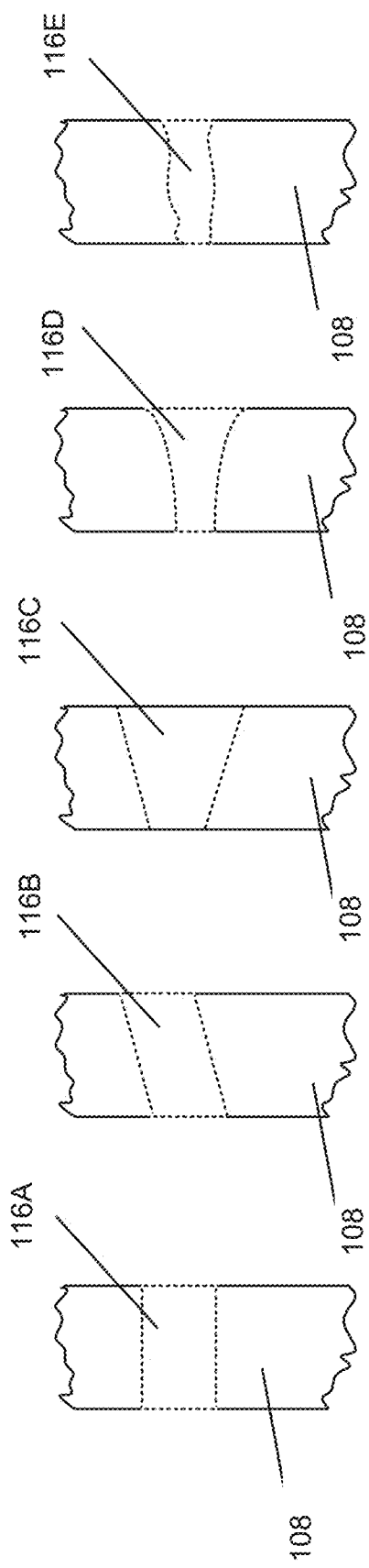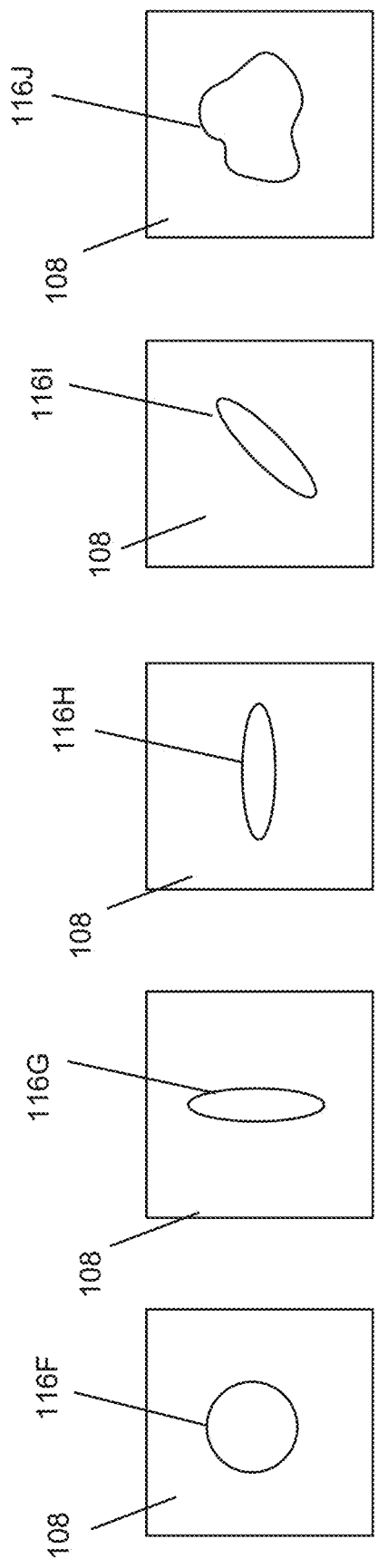

SYSTEMS, DEVICES, AND METHODS FOR ADDITIVE MANUFACTURING

CROSS-REFERENCE TO RELATED APPLICATIONS

This application claims the benefit of priority of U.S. Provisional Application No. 62/627,245, filed Feb. 7, 2018, the entirety of which is incorporated by reference into this application.

BACKGROUND

Powder bed three-dimensional (3D) fabrication is an additive manufacturing technique based on binding particles of a powder to form a 3D object. Binder jetting is one type of powder bed 3D fabrication. In binder jetting, a controlled pattern of the liquid binder is applied to successive layers of the powder in a powder bed such that the layers of the material adhere to one another to form a three-dimensional green part. Through subsequent processing, the three-dimensional green part can be formed into a finished 3D metal, ceramic, and/or polymer part. The term "part," as used herein, is intended to encompass any object fabricated through the additive manufacturing techniques described above.

The 3D parts may be printed within a container, referred to herein as a build box. Once the parts have been printed and cross-linked, but before hardening through heat treatment (i.e., sintering), the parts are relatively soft and susceptible to damage. Unbound powder must be removed from the parts (referred to herein as de-powdering) and the de-powdered parts must be removed from the build box in order for the parts to advance to the sintering furnace. De-powdering and removing the relatively soft parts from the build box may cause damage to the parts.

Known de-powdering techniques typically employ a vacuum to remove excess powder from around the printed parts. Vacuuming the excess powder, however, may have drawbacks due the separation of the smaller particles. For example, filters used within the vacuum system can become easily blocked.

Alternatively, excess powder may be removed manually using hand tools. Using hand tools, however, may damage the un-hardened 3D printed parts and may be time and/or labor intensive.

The described embodiments disclose a de-powdering basket comprising a container disposed within a build box. Side walls of the de-powdering basket are perforated with one or more apertures to allow loose, un-bound powder within the basket to pass from the interior regions of the basket to outside the basket.

The de-powdering basket may be configured to form-fit within the inside of the build box, essentially forming an interior liner of the build box, so that the interior surfaces of the build box walls block the apertures while the de-powdering basket remains within the build box. When the de-powdering basket is removed from the build box, the apertures are no longer blocked by the interior surfaces of the build box walls, thereby allowing the loose, unbound powder to escape the interior of the de-powdering basket.

In some embodiments, the loose powder may simply escape under the force of gravity. In other embodiments, other instrumentalities may be used to facilitate the removal of the loose powder. For example, vibrations may be applied to the de-powdering basket to dislodge the loose powder and further facilitate the egress of the loose powder by the force of gravity. In some embodiments, air jets or fluid (e.g., water) jets may be used instead of or in addition to vibrations to encourage the egress of the loose powder through the apertures.

In one aspect, this disclosure includes a de-powdering basket, comprising an enclosure with at least one side wall and a bottom wall. The enclosure may be configured such that, when the enclosure is disposed within a build box, an outer surface of the at least one side wall is substantially adjacent to an interior surface of the build box. The enclosure further comprises one or more apertures disposed within the at least one side wall. Each of the apertures may comprise a void that extends through an associated side wall from an interior surface of the associated side wall to an exterior surface of the side wall.

The enclosure may be configured to accommodate a build plate situated within the enclosure. Outer edges of the build plate may cooperate with inner surfaces of the three or more side walls of the enclosure to prevent loose powder from passing between the outer edges of the build plate and the three or more side walls. The build plate may define a bottom of a build volume, and the build plate may be articulated downward as successive powder layers are printed.

The de-powdering basket may further include seals disposed on the outer edges of the build plate. The seals may be configured to form a barrier between the edge of the build plate and the enclosure side walls. The bottom wall may further comprise an actuator aperture configured to accommodate an actuator. The actuator may be configured to couple to the build plate and to raise or lower the build plate within the enclosure.

The at least one side wall may comprise three or more side walls, and each of the three or more side walls may be fixedly attached to another of the three or more side walls along a side edge.

The bottom wall may be fixedly attached to bottom edges of the at least one side wall.

The one or more apertures may each be characterized by an orientation through the associated side wall. The orientation may comprise one or both of an angled aperture orientation and a tapered aperture orientation. The angled orientation is characterized by at least one of an angular length through the side wall and an angled aperture opening width. The tapered orientation may be characterized by at least one of a tapered length through the side wall, a taper angle through the side wall, a first tapered aperture bore dimension measured in a plane substantially parallel to the exterior surface of the side wall, and a second tapered aperture bore dimension measured in a plane substantially parallel to the exterior surface of the side wall.

Each of the one or more apertures may be characterized by a shape as projected on the exterior surface of associated side wall. The shape may be one of circular, elliptical, polygonal, star shaped, conic shaped, bi-conic shaped, composite shaped, and irregular shaped.

The at least one side wall may further comprise a gripper interface element. The gripper interface element may comprise a void in the at least one side wall, extending at least partially through the at least one side wall. The gripper interface element may further include a hardened insert. A size and a shape of the gripper interface element may be configured to engage a gripper arm.

In another aspect, this disclosure is drawn to a de-powdering basket, comprising an enclosure with at least one side wall and a bottom wall, and one or more apertures disposed within the at least one side wall. Each of the apertures may comprise a void that extends through an associated side wall from an interior surface of the associated side wall to an exterior surface of the side wall. The de-powdering basket may further comprise at least one door panel, attached to one of the three or more side walls by a hinge element and (i) configured in a first mode to be substantially adjacent to the exterior surface of the side wall, thereby blocking the apertures of the side wall, and (ii) configured in a second mode to be open by rotation of the door panel about the hinge element, thereby facilitating a flow of loose powder through the associated apertures from an interior region of the de-powdering basket to an exterior region of the de-powdering basket.

The enclosure may be configured to accommodate a build plate situated within the enclosure. Outer edges of the build plate may cooperate with inner surfaces of the at least one side wall of the enclosure to prevent loose powder from passing between the outer edges of the build plate and the three or more side walls.

The de-powdering basket may further include seals disposed on the outer edges of the build plate. The seals may be configured to form a barrier between the edge of the build plate and the at least one enclosure side wall.

The bottom wall may further comprise an actuator aperture configured to accommodate an actuator, the actuator configured to couple to the build plate and to raise or lower the build plate within the enclosure.

The one or more apertures may each be characterized by an orientation through the associated side wall. The orientation may comprise one or both of an angled aperture orientation and a tapered aperture orientation, and wherein the angled orientation is characterized by an angular length through the side wall, and an angled aperture opening width. The tapered orientation may be characterized by a tapered length through the side wall, a taper angle through the side wall, a first tapered aperture bore dimension measured in a plane substantially parallel to the exterior surface of the side wall, and a second tapered aperture bore dimension measured in a plane substantially parallel to the exterior surface of the side wall.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIGS. 3A through 3E illustrate several example aperture characteristics, each showing a different passage characteristic through the de-powdering basket side wall.

FIGS. 4A through 4E illustrate example embodiments of shapes of the apertures, as viewed on the surface of the side wall.

DETAILED DESCRIPTION

Figure 1:
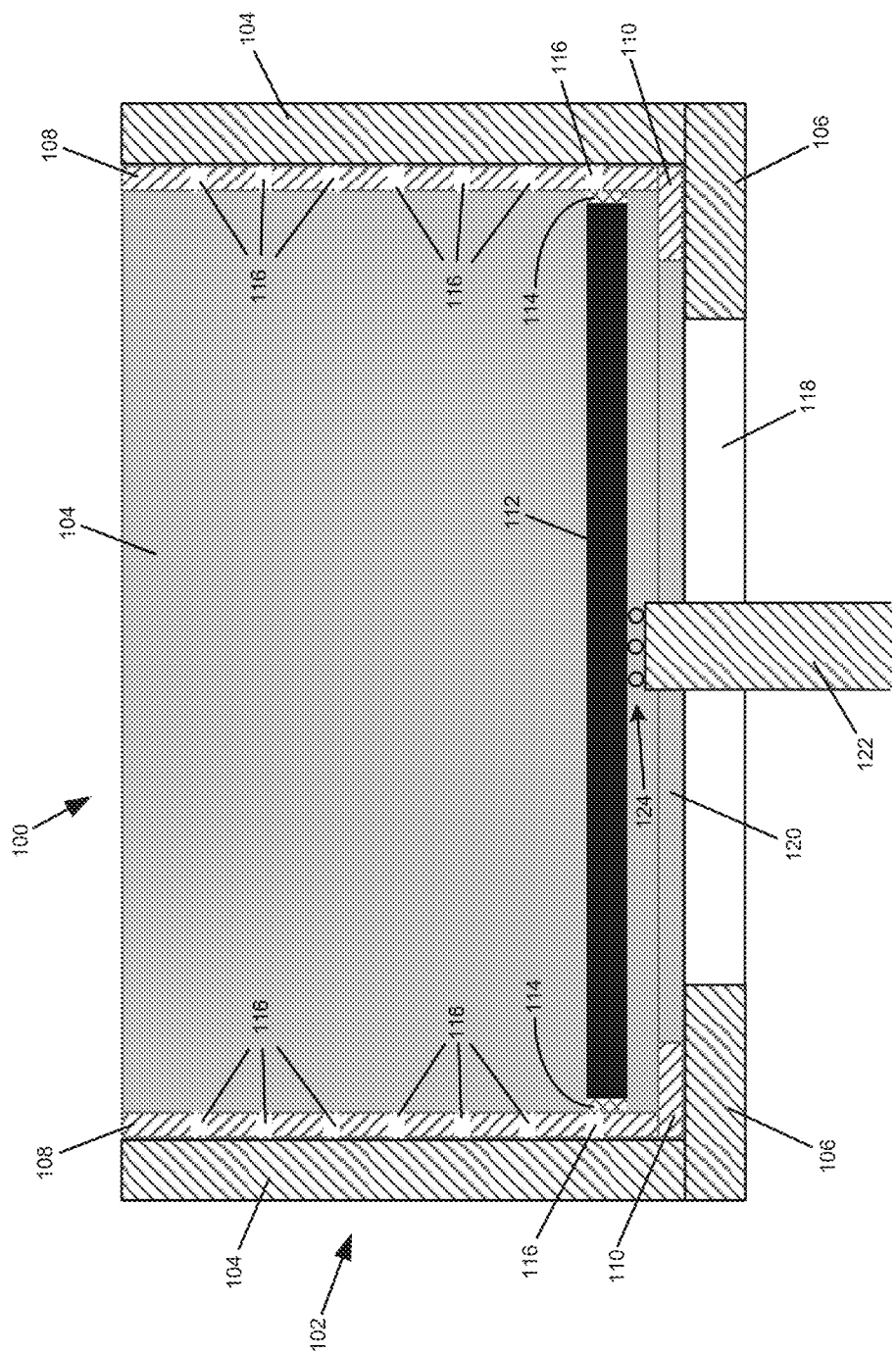
FIG. 1 illustrates, in cross-sectional view, an example embodiment of a de-powdering basket constructed according to the present disclosure.

A description of example embodiments follows.

In a powder bed fabrication system, parts are formed by selectively applying a binder agent to loose powder, layer by layer, within a build box. A build plate, situated within the build box, is incrementally lowered as each layer of loose powder is distributed, thereby forming a powder bed upon the build plate. Regions of bound powder constitute the parts being fabricated, with loose, unbound powder distributed about the regions of bound powder.

In one aspect, one embodiment of the present disclosure includes a de-powdering basket comprising a container disposed within the build box. The de-powdering basket may have at least one side wall and a bottom wall, and may be configured to form an internal liner of the build box. The number of side walls of the de-powdering basket is generally the same as the number of side walls of the build box, although for certain embodiments the number of sidewalls may be different.

The side walls may have one or more apertures, through which loose, unbound powder remaining within the de-powdering basket may pass. Characteristics of the apertures may be established to facilitate efficient transfer of the powder from the inside of the de-powdering basket to the exterior of the de-powdering basket.

A modified build plate may be situated within the de-powdering basket. The surface dimensions (i.e., length, width) of the modified build plate are less than that of the normal build plate, to account for the space taken by the thickness of the side walls of the de-powdering basket 100. An actuator may extend through an aperture of the bottom wall of the de-powdering basket. The actuator associates with the bottom of the build plate at an interface, so that the actuator may be used to raise and/or lower the build plate within the de-powdering basket. In some embodiments, the actuator may contact the build plate without a connection between the actuator and the build plate. In other embodiments, the actuator may be releasably connected to the build plate through, for example, one or more of a friction connection (e.g., press fit), a magnetic connection, a latching connection, or other such releasable connections known in the art.

The build plate may be configured to cooperate with the build box to prevent powder from leaking past the plate, between the outer edges of the plate and the side walls of the de-powdering box. For example, build plate may comprise seals along its periphery, which press against the build box walls to prevent powder from passing between the build box and the build plate.

Embodiments of the side wall(s) and a bottom wall of the de-powdering basket may comprise flat plates joined to one another to improve the sealing characteristics between the de-powdering basket and the build plate. In one example embodiment, the flat plates may comprise one quarter inch aluminum, although other thickness and other materials may alternatively be used. The flat plates may be joined to one another using dip brazing, although other joining techniques known in the art may alternatively be used. Alternatively, an embodiment of the de-powdering basket may comprise a single side wall and a bottom wall. For example, a cylindrical de-powdering basket may comprise a single side wall and a bottom wall, with the side wall disposed at a fixed radius about a central axis. In other embodiments, the side wall may be disposed at varying radii about a central axis, thereby forming an irregularly-shaped (but continuous) side wall. Furthermore, various embodiments of the de-powdering basket may include any number or arrangement of walls in any appropriate shape. For example, the de-powdering basket may be spherical, hemispherical, pyramidal, etc. Individual wall(s) of the de-powdering basket may be triangular, rectangular, pentagonal, etc.

The side wall(s) of the de-powdering box may comprise one or more apertures configured to facilitate efficient powder flow out of the de-powdering basket. Embodiments of the de-powdering basket may assume the form factor of the internal space of the build box. Such embodiments prevent powder from passing through the side wall apertures because the close proximity of the de-powdering side wall(s) to the build box side walls effectively blocks the de-powdering side wall apertures. For example, when the de-powdering basket is positioned within the build box, one or more external portions of the de-powdering basket may abut an internal portion of the build box. For example, one or more external portions of the de-powdering basket may touch one or more internal portions of the build box. In another aspect, one or more external portions of the de-powdering basket may be proximate to one or more internal portions of the build box, with a small space or gap between the de-powdering basket and the build box. In these examples, the internal portion of the build box may effectively block one or more apertures in the de-powdering basket such that any powder or other material that may otherwise pass through the apertures is retained within the apertures and the de-powdering basket.

FIG. 1 illustrates, in cross-sectional view, an example embodiment of a de-powdering basket 100 constructed according to the present disclosure. The de-powdering basket 100 is shown situated within a build box 102. The build box 102 comprises side walls 104 and bottom wall 106. The de-powdering basket 100 comprises side walls 108 and bottom wall 110. A build plate 112, with seals 114 is shown deployed within the de-powdering basket 100. Apertures 116 are shown within the side wall(s) of the de-powdering basket 100. The apertures 116 provide a path from the interior regions of the de-powdering basket 100 to the outside of the de-powdering basket 100.

The build box 102 has a bottom aperture 118, and the de-powdering basket 100 has a bottom aperture 120, through which an actuator arm 122 may pass. The actuator arm 122 interacts with the build plate 112 through an interface 124. Although the example embodiment depicts the interface 124 as a connecting instrumentality, in other embodiments the interface 124 may simply be a contact between the build plate 112 and the actuator arm 122. In some embodiments, the connecting instrumentality may be, for example, one or more of a friction connection (e.g., press fit), a magnetic connection, a latching connection, or other such releasable connections known in the art.

Figure 2:
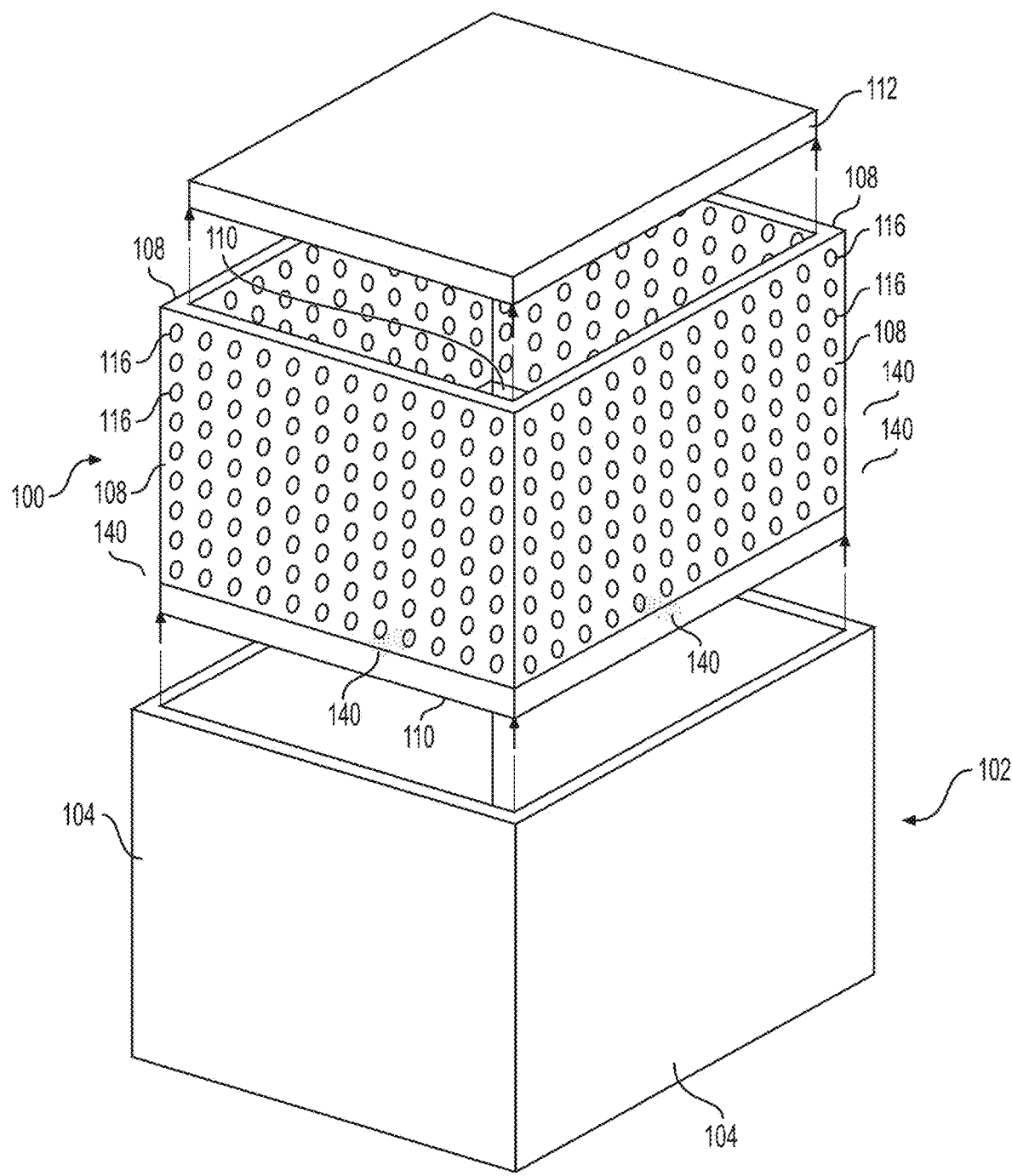
FIG. 2 illustrates an exploded view of the de-powdering basket build box shown in FIG. 1.

FIG. 2 illustrates an exploded view of the de-powdering basket 100. FIG. 2 demonstrates that the de-powdering basket 100 may be removed from the build box 102, and that loose powder 140 may pass through the apertures 116 when the de-powdering basket 100 is removed from the build box 102. It is noted that loose powder 140 is shown as passing through only a subset of apertures 116 in FIG. 2, but loose powder 140 may pass through any or all of the apertures 116 during de-powdering. While the de-powdering basket 100 is within the build box 102, the de-powdering basket side wall apertures 116 are blocked by the build box side walls 104.

In actual use, when the de-powdering basket 100 is removed from the build box 102, the apertures 116 are no longer blocked, and the loose powder 140 within the de-powdering basket 100 can pass unimpeded through the apertures 116 to the outside of the de-powdering basket 100. As the powder is drained slowly from the de-powdering basket 100, the 3D printed parts can be removed safely, reducing the likelihood of damaging the pre-hardened parts.

It should be noted that in FIG. 2, the build plate 112 is shown removed from the de-powdering basket 100. Generally, however, when the de-powdering basket 100 is removed from the build box 102 after the execution of a printing procedure, the build plate 112 will have been lowered into the de-powdering basket 100 to form a print bed above the build plate 112. Stated another way, before a printing or part formation procedure, both the de-powdering basket 100 and the build plate 112 are positioned within the build box 102.

The specific characteristics of the side wall apertures in the de-powdering basket 100 may be determined and established based on the particular mode of powder egress. Such modes may include, for example, one or more of gravity, vibrations applied to the de-powdering basket, air agitation, fluid (e.g., water) agitation, or ultrasonic energy. Additionally or alternatively, de-powdering may include delivering an inert gas (e.g., argon, nitrogen, etc.) into de-powdering basket 100 and/or applying suction to de-powdering basket 100. The aperture characteristics may also depend on the bulk density of the powder mixture. The aperture characteristics may include, for example, aperture shape (e.g., circular, elongated, irregular), aperture through-angle, aperture surface angle orientation, aperture cross section (i.e., from interior side of side wall to exterior side of side wall).

FIGS. 3A through 3E illustrate several example aperture characteristics, each showing a different passage characteristic through the de-powdering basket 100 side wall 108. FIG. 3A illustrates an aperture 116A formed by a straight passage through the side wall 108, perpendicular to the outer face of the side wall 108 and maintaining a constant bore size from outer wall to inner wall.

FIG. 3B shows an aperture 116B formed by an angled passage through the side wall 108, also maintaining a constant bore size from outer wall to inner wall. Some embodiments may incorporate angled passages that angle higher to lower from outer wall to inner wall or inner wall to outer wall. Some embodiments may incorporate passages that angle left to right or right to left, viewed with respect to a face of the side wall. Some embodiments may incorporate passages that angle both left to right or right to left and higher to lower or lower to higher. Although FIG. 3B illustrates that aperture 116B includes a constant width bore through the side wall 108, other shaped passages described herein may also incorporate such an angled orientation.

FIG. 3C shows an aperture 116C formed by a tapered passage through the side wall 108. Although this example embodiment depicts a symmetrical taper through the side wall 108, some embodiments may incorporate an asymmetrical taper. Embodiments may incorporate a larger to smaller taper from the inner wall to the outer wall, or a smaller to larger taper from the inner wall to the outer wall.

FIG. 3D illustrates an aperture 116D formed by a curved, trumpet-shaped passage through the side wall 108. Although this example embodiment depicts a symmetrical curved passage through the side wall 108, some embodiments may incorporate an asymmetrically curved passage.

FIG. 3E shows an aperture 116E formed by an irregular passage through the side wall 108. Such an irregular passage may be indicated, for example, by a simulated model which evaluates properties of the fabrication powder or other related factors.

FIGS. 4A through 4E illustrate example shapes of the apertures, as viewed on the surface of the side wall 108. FIG. 4A shows a circular aperture 116F, while FIGS. 4B through 4C show elliptical apertures 116G-116I orientated at various angles through side wall 108. FIG. 4E shows an irregular aperture 116J in side wall 108. Although not shown, an aperture may have other shapes, such as polygonal, star shaped, conic shaped bi-conic shaped, or composite shapes (i.e., a combination of the shapes described herein and/or other shapes).

Some embodiments may combine a particular passage type, as described with respect to FIGS. 3A through 3E, with a particular aperture shape, as described with respect to FIGS. 4A through 4E. Further, the aperture size may be an important factor for determining and establishing side wall apertures. For example, it may be determined that a particular type of powder flows efficiently through an aperture having a specific ratio of aperture size to aperture ellipticity, or a specific ratio of aperture ellipticity to passage angle through the side wall. Such relationships and associated characteristics may be found in the art in various publications and databases, for example Perry's Chemical Engineers' Handbook. In one aspect, de-powdering basket 100 may be formed of a fine mesh material, and apertures 116 may be larger openings in the mesh material. The material of the de-powdering basket 100 may depend on the type of powder being used in the part formation process. Moreover, the de-powdering basket 100 may be formed of a particular fine mesh such that powder particles may only exit through apertures 116.

Embodiments of the de-powdering basket may include features that facilitate automated or manual removal of the de-powdering basket 100 from the build box 102. Such features can be especially beneficial when heavy parts are present within the de-powdering basket 100 and could be too heavy for a person to handle.

Figure 5B:
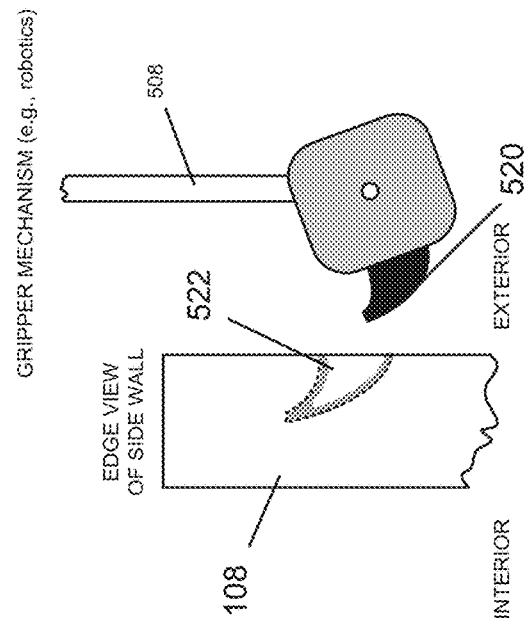
FIGS. 5A through 5C illustrate examples embodiments of a feature that facilitate automated or manual removal of the de-powdering basket from the build box.
Figure 5C:
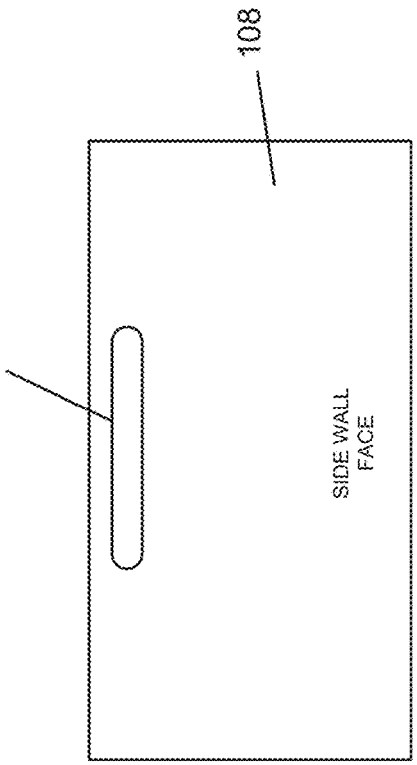
Figure 5A:
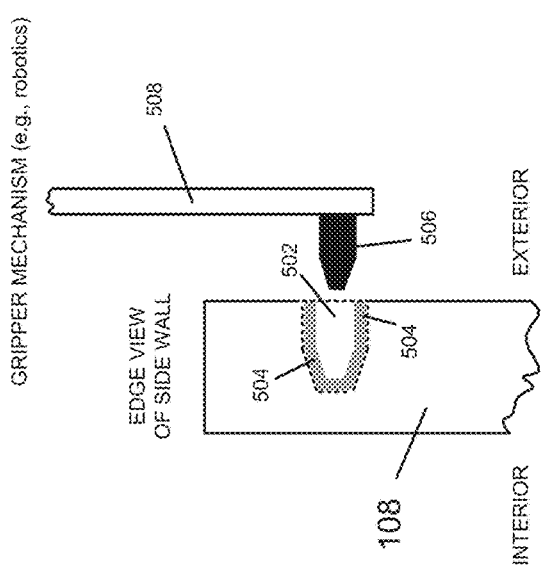

For example, a sidewall 108 of the de-powdering basket 100 may incorporate a hole or indentation to interface with a robotic gripper mechanism. The hole or indentation (i.e., a gripper interface element) may be lined with a hardened insert to withstand repeated encounters with the gripper mechanism. FIG. 5A illustrates an example embodiment of such a feature. A partially tapered hole 502 may be incorporated near the top of a side wall 108 of the de-powdering basket 100. A hardened insert 504 may be inserted into the tapered hole 502. Although the hole 502 in example embodiment of FIG. 5A is shown extending from the exterior face of the side wall 108 partially into the side wall 108, other embodiments may have the hole 502 extending from the interior face of the side wall 108, or completely through the side wall 108.

A matching peg 506, attached to an arm 508 of a robotic gripper mechanism (not shown), may be inserted into the insert-lined hole 502, and used by the robotic arm 508 to lift the de-powdering basket 100 out of the build box 102 (FIG. 2). In some embodiments, two or more of the de-powdering basket side walls 108 may incorporate such insert-lined holes, so that a lift mechanism comprising two or more robotic arms can evenly distribute the lift forces across the de-powdering basket 100.

Although FIG. 5A illustrates one example embodiment of a feature that facilitates removal of the de-powdering basket 100, it should be understood that this technique may be modified depending on the particular gripper mechanism to be utilized, and that other interfaces for removal mechanisms may be used. For example, as shown in FIG. 5B, the gripper mechanism may comprise a hook shaped peg 520, rotatably attached to a robotic arm 508. The side wall 108 of the de-powdering basket 100 may have a matching hole 522 to interface to the hook shaped peg 520. Alternatively, the side wall 108 of the de-powdering basket 100 may include an elongated handle-like aperture 524, as shown in FIG. 5C, which may be grabbed by a robotic mechanism or manually grabbed by a user. The handle-like aperture 524 may further comprise a hardened insert (not shown) as described herein with respect to FIGS. 5A and 5B.

Similar interfacing features may be included on the de-powdering basket 100 to facilitate vibration of the basket, further enhancing the flow of powder from the build box. For example, a similar interfacing feature on the de-powdering basket 100 may interface to a linkage connected to a vibrating mechanism, which imparts a vibration profile to the de-powdering basket 100.

Figure 6:
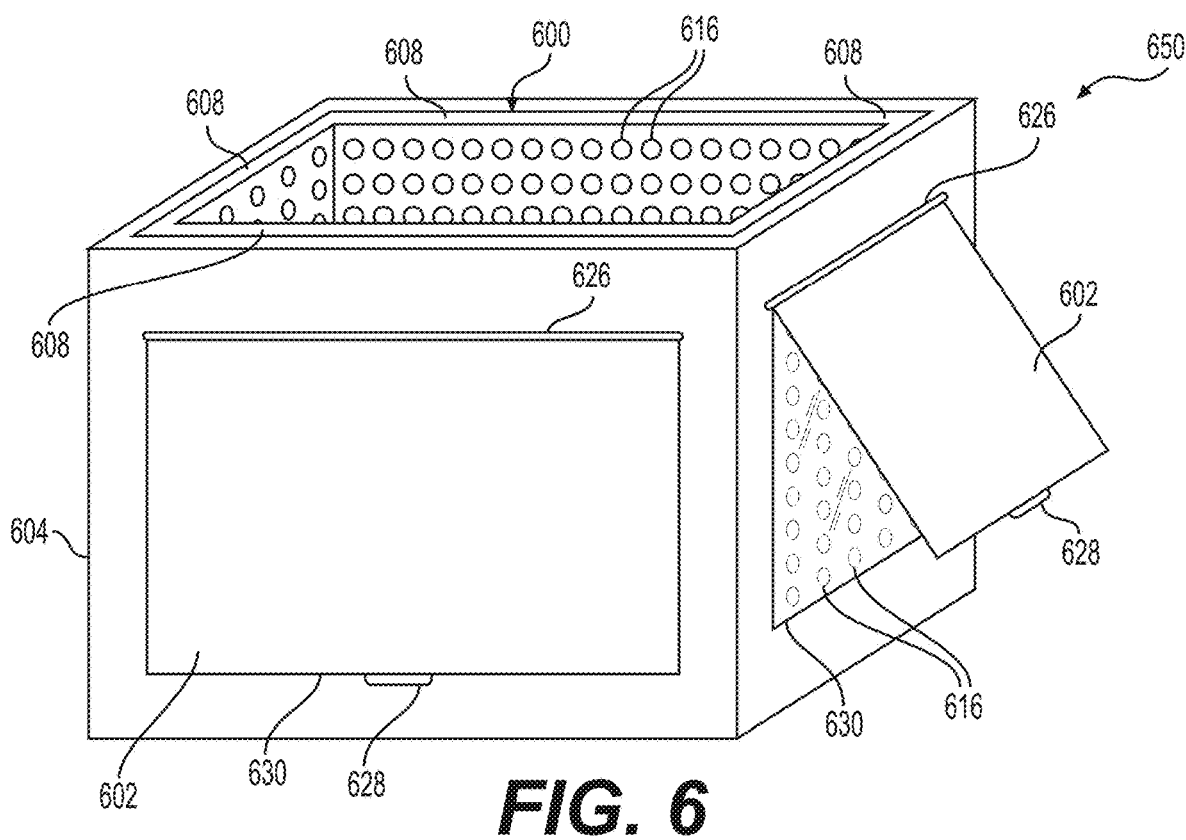
FIG. 6 shows an alternative example embodiment of a de-powdering basket according to the present disclosure.

FIG. 6 shows an alternative example embodiment of a de-powdering system 650 according to the present disclosure. FIG. 6 shows a build box 604 with one or more side panels 602 that may cover windows 630 and block apertures 616 of a de-powdering basket 600 when de-powdering basket 600 is within build box 604. The side panels 602 may include a hinge 626 at one of the edges of the side panel 602. Although the hinge 626 is shown at the top of the side panel 602 in this example embodiment, it should be understood that the hinge 626 could be located at another edge of the side panel 602.

The side panel 602 may further include a facility 628 for keeping the side panel 602 closed against the side wall apertures 616 of de-powdering basket 600. The facility 628 may include, but is not limited to, a latch, or a press fit arrangement. The side panels 602 may block the apertures 616 rather than (or in addition to) the build box sidewalls.

With the one or more side panels 602 closed, the side panels 602 abut side walls 608 of de-powdering basket 600 and block apertures 616. After the part formation procedure, one or more side panels 602 may be opened to expose apertures 616 through window 630. Alternatively or additionally, one or more side panel 602 may be slidable vertically (up or down in FIG. 6) or horizontally relative to build box 604 in order to expose apertures 616 through window 630. Then, a de-powdering procedure may be performed, for example, via vibrations applied to the de-powdering basket, air agitation, fluid (e.g., water) agitation, delivering an inert gas (e.g., argon, nitrogen, etc.) into de-powdering basket 100, or ultrasonic energy. Additionally or alternatively, vacuum pressure may be applied to de-powdering system 650, for example, adjacent to or proximate any exposed apertures 616, in order to aid in the de-powdering procedure. As a result, the excess powder may pass through apertures 616 and out of de-powdering system 650. The excess powder may be collected and reused in a later part formation procedure.

In one aspect, the embodiment of the de-powdering basket 600 shown in FIG. 6 may be used with a build box that is larger or of a different shape than that of the de-powdering basket 600. For example, build box 604 may be larger or a different shape than de-powdering basket 600. Accordingly, there may be a gap or space between one or more of side walls 608 and the internal face of build box 604 and side panels 602.

Figure 7:
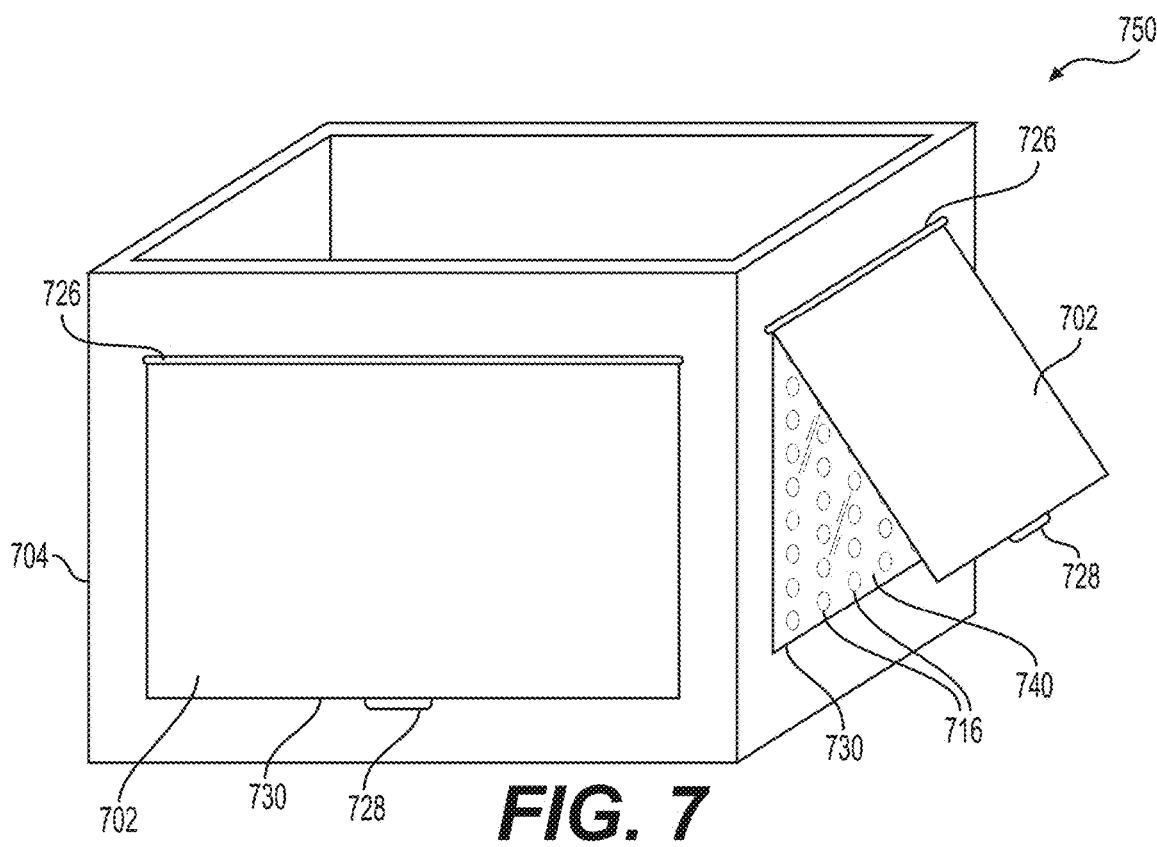
FIG. 7 shows another alternative example embodiment of another de-powdering basket according to the present disclosure.

FIG. 7 shows another alternative example of a de-powdering system 750 according to the present disclosure. FIG. 7 shows a de-powdering structure 704. De-powdering structure 704 includes one or more side panels 702 that are pivotable via respective hinges 726, and may be secured in a closed configuration with respective facilities 728. Side panels 702 may be pivotable or otherwise movable to expose or cover windows 730. For example, one or more side panels 702 may be slidable vertically or horizontally. De-powdering structure 704 may include side panels 702 on each side, or only on a portion of the sides of de-powdering structure 704, as shown in FIG. 7. Additionally, de-powdering structure 704 may include one or more screens 740 covering windows 730. The one or more screens 740 include a plurality of apertures 716, and apertures 716 may be sized to allow excess powder to pass through apertures 716 and be removed from de-powdering structure 704. In one aspect, screens 740 may be separate from de-powdering structure 704 and coupled to, e.g., the internal surface of de-powdering structure 704 to at least partially block windows 730. In another aspect, screens 740 may be integrally formed with de-powdering structure 704, for example, by forming apertures 716 through a portion of de-powdering structure 704.

The de-powdering system 750 may be removed from a build box and transported to another location, so that the de-powdering and part removal procedure can occur away from the printing subsystem. Alternatively, de-powdering system 750 alone may be used as a build box. The part formation may be performed within de-powering structure 704. Then, de-powdering may be performed in the same location, or de-powdering system 750 may be transported to another location for de-powdering. For example, after the part formation is completed, a de-powdering procedure may be performed, for example, via vibrations applied to the de-powdering system 750, air agitation, fluid (e.g., water) agitation, delivering an inert gas (e.g., argon, nitrogen, etc.) into de-powdering system 750, or ultrasonic energy. Additionally or alternatively, vacuum pressure may be applied to de-powdering system 750, for example, adjacent to or proximate any exposed apertures 716, in order to aid in the de-powdering procedure, or de-powdering system 750 may be place in a vacuum environment. As a result, the excess powder may pass through apertures 716 and out of de-powdering system 750. The excess powder may be collected, recycled, and reused in a later part formation procedure.

In some embodiments, the side panels 602 and 702, shown in FIGS. 6 and 7, may simply open to expose the entire powder print bed. In such an embodiment, the side panels 602 and 702 may open to expose one large aperture, allowing access to the loose powder and fabricated parts within the de-powdering basket 600 and de-powdering structure 704 from the side of the basket 600 and de-powdering structure 704. In this aspect, a vacuum or suction source may be coupled to or positioned adjacent to the side panels 602 and 702 and suction may be applied to help remove and/or collect excess powder. Or, in some embodiments, de-powdering basket 600 and de-powdering structure 704 may be placed in a vacuum environment.

While de-powdering systems 650 and 750 are shown with rectangular side panels 602, 702 and regular arrays of circular apertures, it is contemplated that any suitable size, shape, and/or arrangement of panels and apertures may be used. For example, side panels 602, 702 may be circular, square, triangular, or any suitable size and may cover any suitable portion of build box 604 or de-powdering structure 704. Apertures 616, 716 may have any suitable shape and size and may be evenly spaced along de-powdering basket 600 and/or windows 630, 730, or may be irregularly spaced. For example, in some embodiments, there may be a greater concentration of apertures 616, 716 along a lower region of de-powdering basket 600 and/or windows 630, 730.

Additionally, although not shown, de-powdering systems 650 and 750 may include a removable top covering. In this aspect, after the part formation procedure, the top covering may be positioned so as to form a seal around the top of de-powdering systems 650 and 750. The top covering may include an inlet configured to connect with a source of liquid or gas. For example, an inert gas (e.g., argon, nitrogen, etc.) may be delivered through a sealed inlet opening in the top covering or another portion of de-powdering systems 650 and 750. The delivery of inert gas may help to separate excess powder from the formed part(s), as it flows into systems 650, 750 and out of aperture 616, 716. The inert gas may be delivered at a rate sufficient to fluidize the excess powder within systems 650, 750. The delivery rate may depend at least in part on the inert gas and/or on the type of metal powder used. For example, argon may be delivered at a velocity of 2 mm per second to fluidize steel powder. Side panels 602 and 702 may be opened during the delivery of inert gas, and the delivered gas and excess powder may escape from de-powdering systems 650 and 750 via apertures 616, 716. With at least some of the excess powder removed, the de-powdering systems 650 and 750 may be lighter, and thus more easily transported. De-powdering systems 650 and 750 may be coupled to a powder collection device or positioned relative to a powder collection device, such that the excess powder may be collected, for example, filtered out of the inert gas, and re-used, recycled, disposed of, etc. For example, one or cyclonic filters may be incorporated or coupled to—powdering systems 650 and 750 in order to separate excess powder from an air or liquid. Further de-powdering steps may occur next, or the introduction of inert gas may sufficiently remove excess powder such that no other de-powdering steps are needed.

While example embodiments have been particularly shown and described, it will be understood by those skilled in the art that various changes in form and details may be made therein without departing from the scope of the embodiments encompassed by the appended claims.

What is claimed is:

1. An apparatus for formation and de-powdering of one or more parts formed by additive manufacturing, the apparatus comprising:
   a build box;
   a build plate; and
   a removeable de-powdering basket comprising at least one side wall, wherein the removeable de-powdering basket is positioned within the build box,
   wherein the build plate is positioned within the removeable de-powdering basket,
   wherein the at least one side wall is configured to abut an interior surface of the build box, and
   wherein the removeable de-powdering basket includes one or more apertures in the at least one side wall, such that the one or more apertures are blocked by the build box during additive manufacturing of the one or more parts within the build box.

2. The apparatus of claim 1, further comprising one or more seals disposed between one or more outer edges of the build plate and an interior surface of the removeable de-powdering basket, wherein the one or more seals are configured to form a barrier between the one or more outer edges of the build plate and the interior surface of the removeable de-powdering basket.

3. The apparatus of claim 1, further comprising an actuator coupled to a bottom region of the build plate, and wherein the actuator is movable to raise or lower the build plate within the removeable de-powdering basket.

4. The apparatus of claim 1, wherein the one or more apertures includes at least one aperture having at least one of a slope or a width that changes along a length of the aperture from the interior surface of the removeable de-powdering basket to an exterior surface of the removeable de-powdering basket.

5. The apparatus of claim 1, wherein the build box comprises one or more panels that are movable to cover at least a portion of the at least one side wall when in a first position and to expose at least some of the one or more apertures in at least a portion of the at least one side wall when in a second position.

6. The apparatus of claim 1, wherein the at least one side wall of the removeable de-powdering basket includes one or more holes or indentations configured to receive a gripper mechanism for moving the removeable de-powdering basket from the build box.

7. An apparatus for forming and de-powdering one or more parts formed by additive manufacturing, the apparatus comprising:
a de-powdering system configured to receive a build plate for additive manufacturing, wherein the de-powdering system is configured for use as a build box in a powder bed additive manufacturing system;
one or more apertures extending through at least one side of the de-powdering system; and
at least one panel movably coupled to the de-powdering system, wherein the at least one panel is configured to move between at least a first position and a second position,
wherein in the first position, the at least one panel extends along an exterior of the de-powdering system and blocks the one or more apertures,
wherein in the second position, the at least one panel exposes the one or more apertures, and
wherein the de-powdering system is transportable from the powder bed fabrication system to another location for de-powdering.

8. The apparatus of claim 7, further comprising the build plate and one or more seals disposed on outer edges of the build plate, wherein the one or more seals are configured to form a barrier between the outer edges of the build plate and an interior of the de-powdering system.

9. The apparatus of claim 8, further comprising an actuator coupled to a bottom of the build plate, wherein the actuator is movable to raise or lower the build plate within the de-powdering system, and wherein a bottom region of the enclosure includes an actuator aperture through which the actuator is configured to pass.

10. The apparatus of claim 7, wherein the at least one side of the de-powdering system includes a screen, and wherein the one or more apertures extend through the screen.

11. The apparatus of claim 7, wherein a screen forms an interior enclosure within at least a portion of the de-powdering system such that the interior enclosure is located between the build plate and the de-powdering system, wherein the at least one side of the de-powdering system includes a window, and wherein apertures in the screen align with the window.

12. The apparatus of claim 7, wherein the at least one side of the de-powdering system includes a bottom wall and a plurality of side walls, and wherein each of the one or more apertures are formed by a void that extends through one of the plurality of side walls from an interior surface of the de-powdering system to an exterior surface of the de-powdering system.

13. The apparatus of claim 7, wherein the at least one panel is movable between the first position and the second position via a hinge, and wherein the at least one panel includes a latch and/or press fit arrangement to retain the at least one panel in the first configuration when engaged.

14. A method for forming and de-powdering at least one part by additive manufacturing, the method comprising:
delivering a powder material and a binder material to a build plate to form at least one part, wherein the build plate is positioned within a de-powdering structure that includes one or more panels that are at least partially aligned with a plurality of apertures extending through a portion of the de-powdering structure, and wherein the build plate and de-powdering structure are arranged within a powder bed additive manufacturing system;
removing the de-powdering structure from the additive manufacturing system and transporting the de-powdering structure to another location for de-powdering; and
opening the one or more panels to thereby de-powder the at least one part by removing excess powder material from the at least one part such that the excess powder material passes through the plurality of apertures in the de-powdering structure.

15. The method of claim 14, wherein the de-powdering step includes at least one of applying vibrations, delivering gas or liquid, or applying ultrasonic energy to the de-powdering structure.

16. The method of claim 14, wherein the excess powder material is a steel powder, and wherein the de-powdering step includes delivering argon gas at a velocity of 2 mm per second to the de-powdering structure.

17. The method of claim 16, wherein the one or more panels are movable between a first configuration in which the one or more panels block the one or more apertures and a second configuration in which the one or more apertures are exposed,
wherein the method further comprises, before delivering the argon gas, moving the one or more panels from the first configuration to the second configuration.

18. The method of claim 14, further comprising applying a vacuum to the de-powdering structure to remove and collect at least a portion of the excess powder material.

19. The apparatus of claim 7, comprising a plurality of apertures extending through the at least one side of the de-powdering system, wherein in the first position, the at least one panel blocks the plurality of apertures, and wherein in the second position, the at least one panel exposes the plurality of apertures.

* * * * *